UNITED STATES PATENT OFFICE.

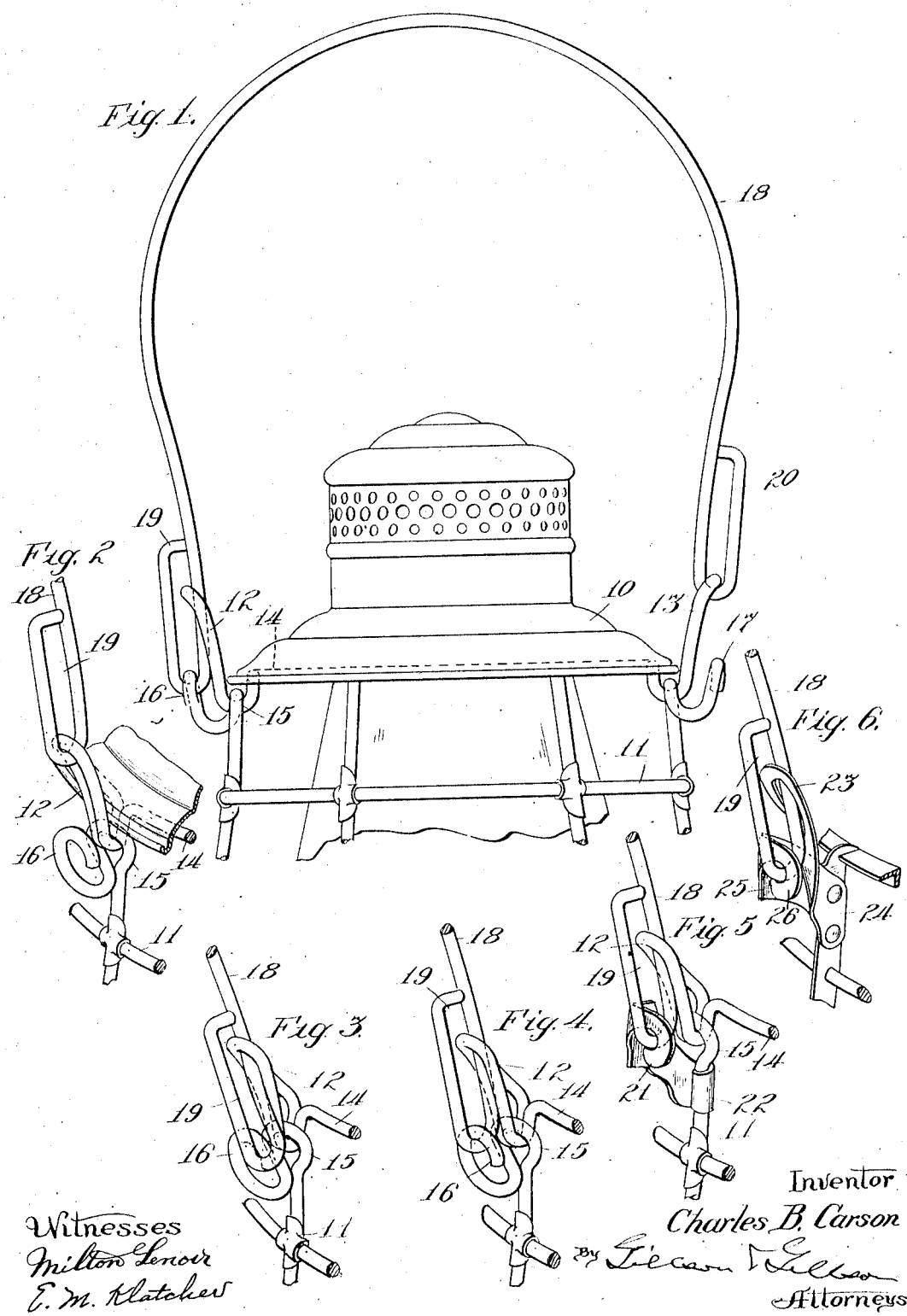

CHARLES B. CARSON, OF CHICAGO, ILLINOIS, ASSIGNOR TO THE ADAMS & WESTLAKE COMPANY, A CORPORATION OF ILLINOIS.

LANTERN.

1,031,420.        Specification of Letters Patent.      Patented July 2, 1912.

Application filed March 25, 1912. Serial No. 686,033.

*To all whom it may concern:*

Be it known that I, CHARLES B. CARSON, a citizen of the United States, and resident of Chicago, county of Cook, and State of Illinois, have invented certain new and useful Improvements in Lanterns, of which the following is a specification, and which are illustrated in the accompanying drawings, forming a part thereof.

The invention relates to lanterns especially adapted for use by railroad men; its object being to provide improved means for locking a normally swinging bail for the purpose of better adapting the lantern for use in signaling.

The invention consists in a structure such as is hereinafter fully described, and as illustrated in the accompanying drawings, in which—

Figure 1 is a detail side elevation of a lantern embodying the invention; Fig. 2 is a detail showing the locking mechanism, the bail being free to swing; Fig. 3 is a similar view illustrating the operation of locking the bail; Fig. 4 is a similar detail showing the bail engaged by the lock; Fig. 5 is a detail of the locking mechanism showing a modified form of construction; and Fig. 6 is a similar detail of the modification shown in Fig. 5, the device being applied to a different type of guard frame.

The lantern 10 is shown in Figs. 1 to 5 as being provided with a wire guard frame 11, the bail ears 12, 13, being in the form of loops integral with the top ring 14 of the frame, these loops extending through eyes, as 15, formed at the upper ends of upright elements of the guard frame.

The bail lock in the construction illustrated in Figs. 1 to 4 takes the form of a hook, as 16, 17, outstanding from and integral with the eye 15. The bail 18 is provided with loops 19, 20, at its ends, which take into the bail ears 12, 13. These loops are elongated, as shown, permitting vertical play of the bail through the ears, and to facilitate this action the ears are inclined outwardly. Normally the bail will swing freely in the ears, but should it be desired to lock the bail in its upright position one or both of its sides or ends is thrust downwardly through the ear, its loop being caught into the hook 16.

While there is shown in the drawings locking means for coöperating with both ends of the bail and this construction is preferred for convenience, the bail will be securely held if locked at one end only.

As shown in Fig. 5, in lieu of the integral hook 16 a hook 21 may be formed on a sheet metal clip 22 secured to the guard frame.

In the construction illustrated in Fig. 6, the invention is applied to a so-called steel guard frame, that is to say, a guard frame made in part of sheet metal cut into strips. In practice the bail ears 23 of such a lantern are also of sheet metal, consisting of a clip riveted to one of the uprights of a guard frame and projecting upwardly, and being apertured to form a loop for engagement by the bail.

As a convenient means for applying the present invention to this type of lantern, the bail ear clip 24 is provided with a wing 25, shaped into a hook 26 for engaging and locking the bail 18.

I claim as my invention—

1. In a lantern, a pair of outstanding bail ears in loop form, a hook located below one of the ears, and a bail having an elongated loop interengaged with one of the ears and being engageable with the hook.

2. In a lantern, in combination, a wire guard frame comprising upright and circumferential elements, a pair of the uprights being looped at their upper ends and one thereof having its end formed into an outstanding hook, the upper circumferential element being formed with loops projecting through the loops of the pair of upright elements to constitute bail ears, and a bail having loops interengaged with the bail ears, one thereof being elongated and engageable with the hook.

CHARLES B. CARSON.

Witnesses:
LOUIS K. GILLSON,
E. M. KLATCHER.